Patented Oct. 8, 1940

2,216,837

UNITED STATES PATENT OFFICE 2,216,837

PROCESS FOR THE MANUFACTURE OF SATURATED AND UNSATURATED KETONES OF THE PREGNAN SERIES

Max Hartmann, Riehen, and Albert Wettstein, Basel, Switzerland, assignors to the firm Society of Chemical Industry In Basle, Basel, Switzerland No Drawing. Application March 17, 1937, Serial No. 131,518. In Switzerland March 23, 1936

15 Claims. (Cl. 260—397)

This invention relates to the manufacture of saturated and unsaturated ketones of the pregnan series by splitting by oxidation the double linking of the unsaturated γ-lactone side chain in derivatives of nuclear saturated genins of the heart glucosides of the formula

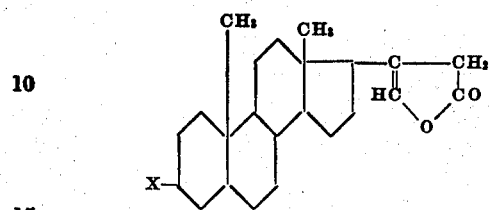

wherein X is a hydroxyl group or a group capable of being reconverted into a hydroxyl group and wherein there may be if desired further hydroxyl groups, then subjecting the β-ketocarboxylic acids thus produced to ketone scission, if desired causing a water-eliminating agent to act on the methyl ketones formed for the purpose of partially or completely removing hydroxyl groups which may be present, hydrogenating unsaturated compounds if desired, restoring if desired at any stage of the reaction after the said oxidation the free hydroxyl group in 3-position, converting the secondary carbinol groups into keto-groups and if desired eliminating in the form of water any tertiary hydroxyl groups which may still be present.

Suitable parent materials are, for example, periplogenin (3,5,14-trihydroxy-compound), digitoxigenin (3,14-dihydroxy-compound), uzarigenin (3,5,8-trihydroxy-compound), gitoxigenin (3,14,16-trihydroxy-compound), digoxigenin (3,11,14-trihydroxy-compound), all of which are based on the carbon atom skeleton:

There may also be used as parent materials, for example, derivatives of the above compounds which are produced by partial or complete elimination of the tertiary hydroxyl groups in the form of water and by subsequent partial hydrogenation not affecting the unsaturated lactone ring (see, for example, the compounds of Formulae V and IX below).

The elimination by oxidation of the double linking present in the lactone ring may be effected in the following manner, for example, namely by ozonizing and splitting the ozonide by the action of a peroxide such as perbenzoic acid or hydrogen peroxide, preferably in the presence of osmium tetroxide, or by addition of two hydroxyl groups at the double linking and splitting the glycol thus produced, for instance by chromic acid or lead tetracetate. The secondary hydroxyl groups are protected from the oxidation effect, if necessary for instance by esterification or etherification.

If the methyl ketone formed contains tertiary hydroxyl groups these may be removed in stages or in a single stage by gentle action of an agent that eliminates water, for example alcoholic hydrochloric acid, there being formed methyl ketones unsaturated in the nucleus. The water elimination may even be combined with the ketone scission.

The compounds unsaturated in the nucleus obtainable in the foregoing manner may be hydrogenated if desired to produce saturation of the nucleus. If only a partial elimination of water with subsequent hydrogenation is undertaken it may be followed by further elimination of water with or without subsequent hydrogenation. If during the hydrogenation of compounds unsaturated in the nucleus to produce compounds saturated in the nucleus, ketone groups, for example at the 20-carbon atom, are reduced to carbinol groups then in the subsequent oxidation or dehydrogenation the carbinol groups will again become ketone groups. The elimination of hydroxyl groups at carbon atom 5 in the form of water is particularly easy if the carbinol group in 3-position has previously been converted into a ketone group.

The secondary carbinol groups, for example that in 3-position, are oxidized to keto-groups at any desired stage of the series of reactions, for example by chromic acid in glacial acetic acid, or they may be dehydrogenated, for example with copper bronze.

In the subjoined scheme the reactions comprised in the process of the invention are set forth:
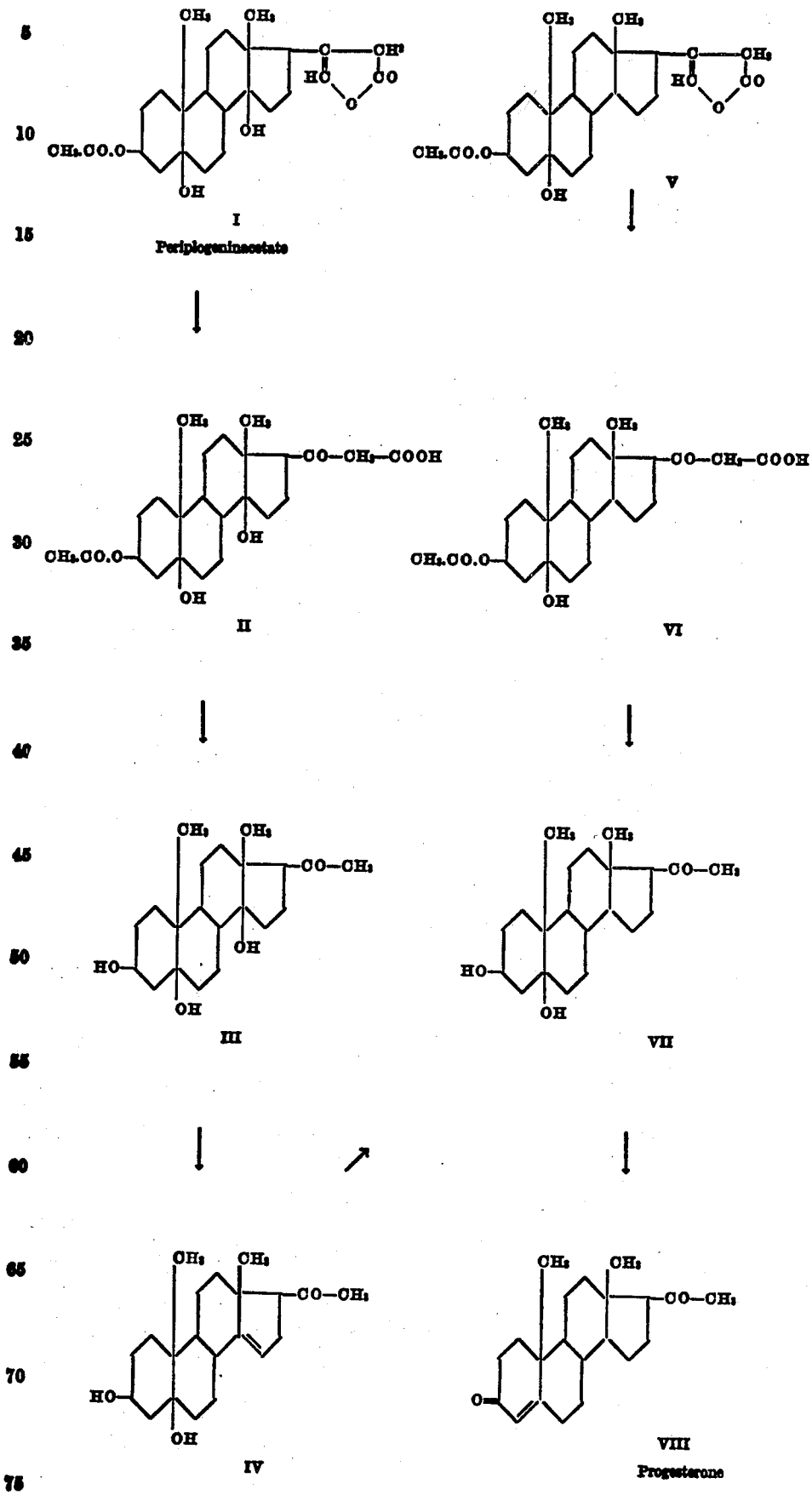

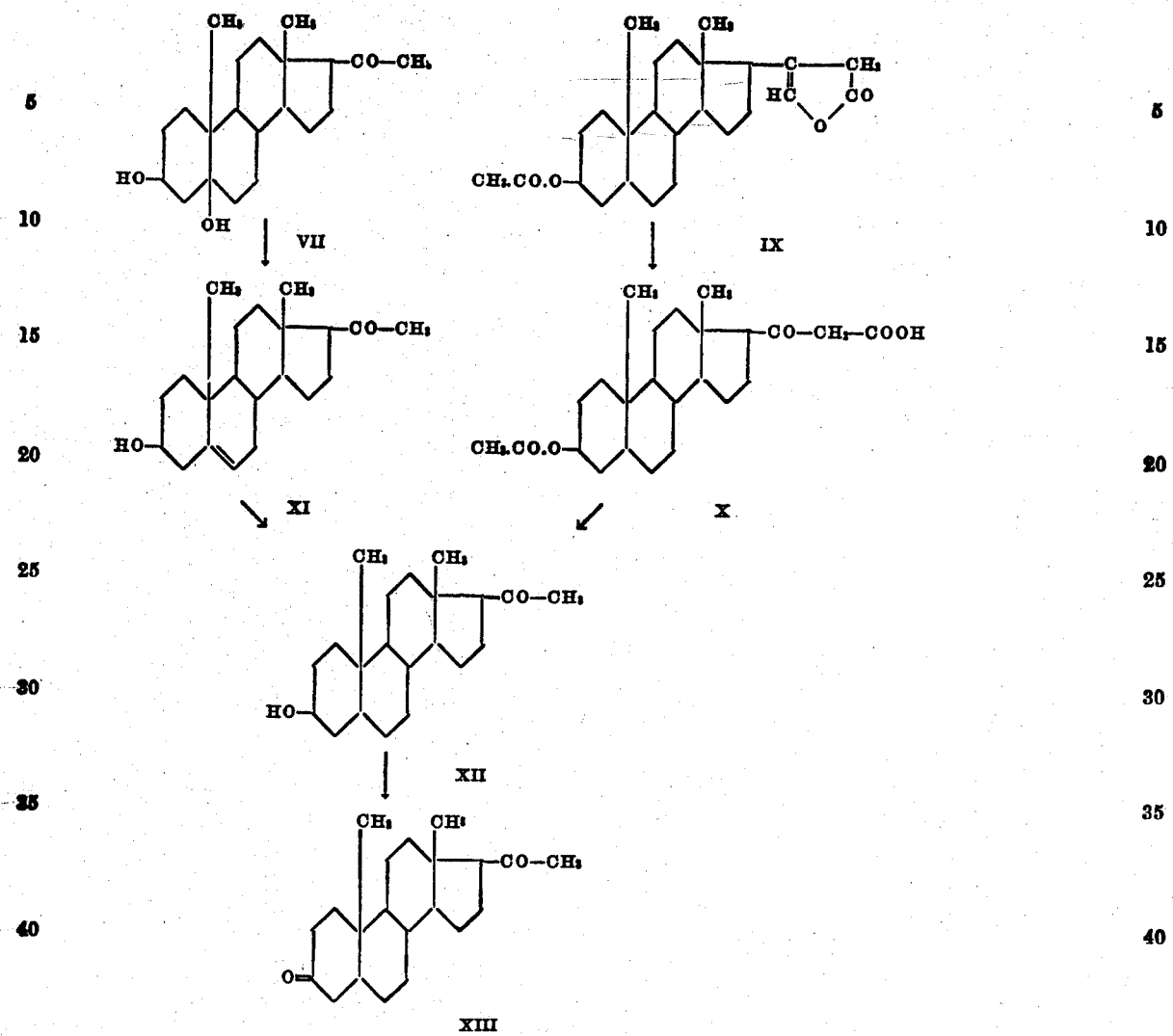

It will be apparent to those skilled in the art that by analogous reactions, digitoxigenin (the 3,14-dihydroxy compound), gitoxigenin (the 3,14,16-trihydroxy compound), and the digoxigenin (the 3,11,14-trihydroxy compound), hereinbefore enumerated together with periplogenin (the 3,5,14-trihydroxy compound) as suitable parent materials, may respectively be converted as follows:

gitoxigenin→$\Delta^{14,15}$-16-keto-pregnene-dione-(3,20)
digitoxigenin→14-hydroxy-pregnane-dione-(3,20)
digoxigenin→11-keto-14-hydroxy-pregnane-dione-(3,20)

The products of the process are in themselves of therapeutic value or they may be used as intermediate products for the manufacture of other compounds of the sex hormone series. The compound of the above Formula VIII represents progesterone.

The following examples illustrate the invention, the parts being by weight:

Example 1

1 part of periplogeninacetate of the Formula I is dissolved in glacial acetic acid or carbon tetrachloride and treated at a low temperature with ozone; the greater part of the acetic acid is evaporated and the residue is heated with water for some time on the water bath for the purpose of decomposing the ozonide. The product obtained by evaporation in a vacuum is saponified after complete elimination of the carbon monoxide by means of alkali lye and a preparation is thus obtained which may be recrystallized from dilute alcohol and then appears to be a saturated methyl ketone of the Formula III. It is now treated at room temperature with a solution of 5 per cent. strength of hydrochloric acid in methyl alcohol, whereby a tertiary hydroxyl group at carbon atom 14 is split off in the form of water and the unsaturated methyl ketone of the Formula IV is produced; this also may be recrystallized from dilute alcohol. By catalytic hydrogenation with hydrogen there is obtained from this ketone the saturated methyl ketone of Formula VII.

In the saturated methyl ketone (Formula VII) the carbinol group in 3-position is oxidized with 1½ times the calculated quantity of chromium trioxide in glacial acetic acid solution at room temperature, then the excess of chromic acid is destroyed by means of methanol and there is added so much of a concentrated solution of hydrogen chloride in glacial acetic acid that the hydrochloric acid concentration amounts to 5 per cent. In this manner the last tertiary hydroxyl group in 5-position is eliminated and there is obtained after sublimation in a high vacuum (0.0005 mm. of mercury) at about 100° C. and recrystallizing from hexane or ethyl acetate the progesterone of Formula VIII which crystallizes in two forms of melting point 129° C. and 120° C. respectively.

*Example 2*

1 part of the compound of Formula V, obtainable from periplogenin by cautiously eliminating water and then partially hydrogenizing and acetylating, is dissolved in glacial acetic acid and, while cooling, ozone is passed into the solution. The whole is then concentrated, poured into water and heated for a short time in a vacuum for the splitting of the ozonide and for ketone scission. The product which has been sucked off is saponified with caustic lye and the compound of Formula VII purified by recrystallization from dilute acetone is worked up to progesterone as described in Example 1.

What we claim is:

1. A process for the manufacture of saturated and unsaturated ketones of the pregnane series, consisting in splitting by oxidation the double linking of the unsaturated gamma-lactone side chain in the derivatives of nuclear saturated genins of heart glucosides having the formula

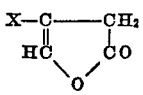

wherein X represents a dimethyl-cyclopentano-perhydro-phenanthrene nucleus, substituted at least in its 3-position by a member of the group consisting of a hydroxyl group and a group which is capable of being converted into a hydroxyl group, then causing the β-keto-carboxylic acids thus produced to react with an agent capable of splitting off carbon dioxide and oxidizing the secondary carbinol groups into keto groups, after first converting into hydroxyl groups those groups convertible thereto.

2. A process for the manufacture of saturated and unsaturated ketones of the pregnane series, consisting in splitting by oxidation the double linking of the unsaturated gamma-lactone side chain in the derivatives of nuclear saturated genins of heart glucosides having the formula

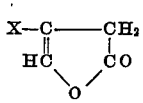

wherein X represents a dimethyl-cyclopentano-perhydro-phenanthrene-nucleus, substituted at least in its 3-position by a member of the group consisting of a hydroxyl group and a group which is capable of being converted into a hydroxyl group, then causing the β-keto-carboxylic acids thus produced to react with an agent capable of splitting off carbon dioxide, causing a water-eliminating agent to act on the methyl ketones thus formed for the purpose of removing tertiary hydroxyl groups present, and oxidizing the secondary carbinol groups into keto groups, after first converting into hydroxyl groups those groups convertible thereto.

3. A process for the manufacture of saturated and unsaturated ketones of the pregnane series, consisting in splitting by oxidation the double linking of the unsaturated gamma-lactone side chain in the derivatives of nuclear saturated genins of heart glucosides having the formula

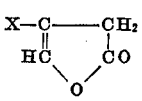

wherein X represents a dimethyl-cyclopentano-perhydro-phenanthrene-nucleus, substituted at least in its 3-position by a member of the group consisting of a hydroxyl group and a group which is capable of being converted into a hydroxyl group, then causing the β-keto-carboxylic acids thus produced to react with an agent capable of splitting off carbon dioxide, causing a water-eliminating agent to act on the methyl ketones thus formed for the purpose of removing tertiary hydroxyl groups present, hydrogenating unsaturated compounds obtained by this elimination of water, and oxidizing the secondary carbinol groups into keto groups, after first converting into hydroxyl groups those groups convertible thereto.

4. A process for the manufacture of 3,11,20-triketo-pregnane as claimed in claim 3, wherein there are used as starting materials the derivatives of digoxigenin substituted in 3- and 11-position by a group which is convertible into a hydroxyl group.

5. A process for the manufacture of saturated and unsaturated ketones of the pregnane series, consisting in splitting by oxidation the double linking of the unsaturated gamma-lactone side chain in the derivatives of nuclear saturated genins of heart glucosides having the formula

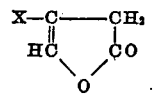

wherein X represents a dimethyl-cyclopentano-perhydro-phenanthrene-nucleus, substituted at least in its 3-position by a member of the group consisting of a hydroxyl group and a group which is capable of being converted into a hydroxyl group, then causing the β-keto-carboxylic acids thus produced to react with an agent capable of splitting off carbon dioxide, causing a water-eliminating agent to act on the methyl ketones thus formed for the purpose of partially removing tertiary hydroxyl groups present and oxidizing the secondary carbinol groups into keto groups, after first converting into hydroxyl groups those groups convertible thereto.

6. A process for the manufacture of saturated and unsaturated ketones of the pregnane series, consisting in splitting by oxidation the double linking of the unsaturated gamma-lactone side chain in the derivatives of nuclear saturated genins of heart glucosides having the formula

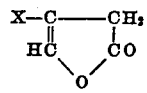

wherein X represents a dimethyl-cyclopentano-perhydro-phenanthrene-nucleus, substituted at least in its 3-position by a member of the group consisting of a hydroxyl group and a group which is capable of being converted into a hydroxyl group, then causing the β-keto-carboxylic acids thus produced to react with an agent capable of splitting off carbon dioxide, causing a water-eliminating agent to act on the methyl ketones thus formed for the purpose of partially removing tertiary hydroxyl groups present, hydrogenating unsaturated compounds obtained by this elimination of water, and oxidizing the secondary carbinol groups into keto groups, after first converting into hydroxyl groups those groups convertible thereto.

7. A process for the manufacture of saturated and unsaturated ketones of the pregnane series, consisting in splitting by oxidation the double linking of the unsaturated gamma-lactone side chain in the derivatives of nuclear saturated genins of heart glucosides having the formula

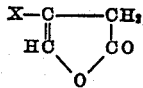

wherein X represents a dimethyl-cyclopentano-perhydro-phenanthrene-nucleus, substituted at least in its 3-position by a member of the group consisting of a hydroxyl group and a group which is capable of being converted into a hydroxyl group, then causing the β-keto-carboxylic acids thus produced to react with an agent capable of splitting off carbon dioxide, causing a water-eliminating agent to act on the methyl ketones thus formed for the purpose of partially removing tertiary hydroxyl groups present, hydrogenating unsaturated compounds obtained by this elimination of water, oxidizing the secondary carbinol groups into keto groups, after first converting into hydroxyl groups those groups convertible thereto, and causing the products obtained to react with a water eliminating agent.

8. A process for the manufacture of $\Delta^{4,5}$-pregnenedione-(3,20) as claimed in claim 7, wherein there are used as starting materials the derivatives of periplogenin substituted in 3-position by a group which is convertible into a hydroxyl group.

9. A process for the manufacture of saturated and unsaturated ketones of the pregnane series, consisting in splitting by oxidation the double linking of the unsaturated gamma-lactone side chain in the derivatives of nuclear saturated genins of heart glucosides having the formula

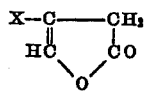

wherein X represents a dimethyl-cyclopentano-perhydro-phenanthrene-nucleus, substituted at least in its 3-position by a member of the group consisting of a hydroxyl group and a group which is capable of being converted into a hydroxyl group, then causing the β-keto-carboxylic acids thus produced to react with an agent capable of splitting off carbon dioxide, oxidizing the secondary carbinol groups into keto groups, after first converting into hydroxyl groups those groups convertible thereto, and causing a water-eliminating agent to act on the poly-ketones thus formed for the purpose of removing tertiary hydroxyl groups present.

10. A process for the manufacture of $\Delta^{4,5}$-pregnenedione-(3,20) as claimed in claim 9, wherein there are used as starting materials the derivatives of dihydro-anhydro-peri-plogenin substituted in 3-position by a group which is convertible into a hydroxyl group.

11. The saturated and unsaturated pregnane-diones-(3,20), having in the nuclei C—D at least one further group consisting of keto- and hydroxyl-groups.

12. The 11-keto-pregnane-diones-(3,20).

13. The $\Delta^{14,15}$-keto-pregnene-dione-(3,20).

14. The 14-hydroxy-pregnane-diones-(3,20).

15. The 11-keto-14-hydroxy-pregnane-dione-(3,20).

MAX HARTMANN.
ALBERT WETTSTEIN.